United States Patent [19]
Atterbury et al.

[11] Patent Number: 5,363,673
[45] Date of Patent: Nov. 15, 1994

[54] SIMPLIFIED ENGINE COOLANT SYSTEM FOR GAS ENGINE HEAT PUMP

[75] Inventors: William G. Atterbury, Worthington; Douglas E. Boyd, Dublin, both of Ohio

[73] Assignee: Gas Research Institute, Chicago, Ill.

[21] Appl. No.: 90,512

[22] Filed: Jul. 12, 1993

Related U.S. Application Data

[63] Continuation-in-part of Ser. No. 919,037, Jul. 24, 1992, Pat. No. 5,249,742.

[51] Int. Cl.⁵ ............................................. F25B 27/00
[52] U.S. Cl. .................................... 62/323.1; 237/2 B; 165/29
[58] Field of Search .................... 237/2 B, 12.1; 62/324.1, 323.1, 238.6, 238.7; 165/18, 29

[56] References Cited

U.S. PATENT DOCUMENTS

| | | | |
|---|---|---|---|
| 3,139,924 | 7/1964 | Schreiner | 165/29 |
| 3,421,339 | 1/1969 | Volk et al. | 62/159 |
| 4,292,814 | 10/1981 | Braun | 62/243 |
| 4,408,715 | 10/1983 | Gueneau | 237/2 B |
| 4,510,762 | 4/1985 | Richarts | 62/79 |
| 4,776,181 | 10/1988 | Maule | 62/323.1 |
| 4,910,969 | 5/1990 | Dalin et al. | 62/238.6 |
| 4,991,400 | 2/1991 | Wilkinson | 62/228.4 |
| 5,003,788 | 4/1991 | Fischer | 62/238.7 |
| 5,020,320 | 6/1991 | Talbert et al. | 62/238.7 |
| 5,029,449 | 7/1991 | Wilkinson | 62/175 |
| 5,099,651 | 3/1992 | Fischer | 62/79 |

Primary Examiner—Henry A. Bennett
Attorney, Agent, or Firm—Watkins, Dunbar & Pollick

[57] ABSTRACT

A coolant fluid circulation subsystem for engine driven heat pump systems including a coolant fluid loop through the engine and a recuperator, and through a thermostatic control valve operable to convey and to modulate flow from a coolant reservoir during engine operation, with the coolant fluid being selectively switchable, between first or second heat exchangers in heat exchange relation with the indoor and outdoor ambient condition selectively. An auxiliary pump and coolant fluid heater are provided in the subsystem to increase the heat contained in the coolant fluid and to exchange heat to the indoor ambient condition.

19 Claims, 2 Drawing Sheets

SIMPLIFIED ENGINE COOLANT SYSTEM FOR GAS ENGINE HEAT PUMP

CROSS-REFERENCE TO RELATED APPLICATION

This is a continuation-in-part of application Ser. No. 07/919,037, filed Jul. 24, 1992, now U.S. Pat. No. 5,249,742, issued Oct. 5, 1993, the disclosure of which is hereby incorporated by reference.

FIELD OF THE INVENTION

This invention relates to a method and system for circulating the engine coolant as a subsystem in an engine driven heat pump system. In particular, it relates to a method and apparatus for the circulation of engine coolant in a gas engine driven heat pump system which is used primarily to control the internal environment and comfort condition in the living quarters and working space of a structure.

BACKGROUND OF THE INVENTION

Broadly speaking, heat engine driven heat pump systems are well known and have been refined for internal space conditioning use as shown in U.S. Pat. No. 4,991,450. Because heat engines, such as natural gas driven internal combustion engines, provide excess and otherwise unused heat in the motive process subsystems have been developed which recapture otherwise waste heat which is circulating in the engine coolant. U.S. Pat. Nos. 5,003,788, 5,020,320, 5,029,449, 5,099,651 and are further examples of this type of subsystem.

Further improvements in these subsystems provide advantages in waste heat recovery to the application of such heat to the occupants of the space and in some instances for other purposes.

Traditionally heat pumps such as electric motor driven heat pumps do not have sufficient excess available heat for use in such subsystems.

Further refinements and improvements in waste heat recovery subsystems are important since they increase the overall coefficient of performance (COP) of the heat pump system as well as providing overall operational economies by reducing the amount of externally supplied auxiliary heat and increase the comfort of the delivered air. In some systems the extra heat is used for domestic water heating and other purposes. Thus, the user obtains these benefits as an "extra" from the recovery of the waste heat.

While this invention is described herein in association with a gas fueled internal combustion engine, broader applications to other "heat" engines, such as turbines, may be possible. The coolant fluid employed in the subsystem may be one of various conventional types, such as ethylene glycol-water or propylene glycol-water mixtures.

SUMMARY OF THE INVENTION

In summary this invention is a coolant circulation subsystem for a heat engine heat pump system comprising: a refrigeration cycle heat pump compressor driven by a heat engine with an engine coolant subsystem in fluid connection with the heat engine including an engine exhaust recouperator in thermal connection with the engine exhaust and to receive coolant flow in the subsystem from the engine. A thermostatic coolant control valve is in fluid connection with the recouperator to receive and control the coolant fluid in response to the temperature of the coolant fluid. Also included in the subsystem is a first pump driven by the engine in fluid connection with the thermostatic control valve to convey coolant fluid to the engine and complete a first loop circuit, which is operable by the control of the thermostatic control valve to warm or cool the engine more rapidly when the subsystem operation will benefit therefrom.

In a first embodiment, the coolant circulation subsystem also includes a coolant fluid reservoir in fluid connection with an inlet of the thermostatic control valve to supply the coolant fluid to the engine as required to warm or cool the engine by modulation of coolant flow through the thermostatic control valve. The invention further includes a switching valve in connection with the recouperator to receive coolant fluid. The switching valve is also in connection with a first heat exchanger in heat exchange relation to an ambient sink or source; and in connection with a second heat exchanger in heat exchange relation to a heating or cooling load, to selectively switch the coolant flow to the first heat exchanger in the cooling mode of operation or to the second heat exchanger in the heating mode of operation.

Also included is a first conduit means connecting the first heat exchanger and the reservoir to return coolant fluid to the reservoir in the cooling mode of operation. A second pump and an auxiliary heating means are provided in the connection between the switching valve and the second heat exchanger. The second pump supplies coolant fluid through the auxiliary heating means to the second heat exchanger, and a second conduit means is provided connecting the second heat exchanger to the reservoir to flow auxiliary heated coolant in the heating mode of operation.

There is also provided a third conduit connecting the reservoir to the second pump through a check valve to supply auxiliary heated coolant fluid to the subsystem during the heating mode of operation by selective operation of the second pump and of the auxiliary heating means.

In a second, preferred, embodiment, the coolant circulation subsystem eliminates the coolant fluid reservoir, an expensive component, and replaces its functions with a redesigned recouperator having increased fluid volume. The redesigned recouperator remains in thermal connection with the engine exhaust and in fluid connection with the engine to receive coolant fluid in the coolant subsystem from the engine. However, the redesigned recouperator reduces the amount of coolant charge required for the subsystem, thus reducing the warm-up times of the coolant and the steady state losses from the coolant circuit. Use of the recouperator as the fill point for the coolant subsystem eliminates the need to bleed air from the high point of the subsystem (the recouperator) when initially filling the subsystem, and the greater cross-sectional area of the recouperator improves the ability of the system to separate and remove air bubbles from the coolant during both filling and operation.

In the second embodiment, the thermostatic control valve remains in fluid connection with the recouperator to receive the coolant flow through a first inlet and control coolant flow in response to the temperature of the coolant fluid. As well, the first pump remains in fluid connection with the thermostatic control valve to convey coolant fluid to the engine and complete a first loop circuit, operable by the control of the thermostatic means to warm or cool the engine more rapidly when the subsystem operation will benefit therefrom. However, the elimination of the reservoir and redesign of the recouperator causes the engine warm-up loop to be in full communication with the fill point, making easier initial filling of the subsystem with coolant.

Moreover, the elimination of the reservoir and redesign of the recouperator permits the subsystem elements to be advantageously reconfigured. In the second embodiment, the switching valve is moved to the downstream side of the first and second heat exchangers. The outlet of the switching valve is in fluid connection with a second inlet of the thermostatic control valve to supply coolant fluid to the engine means as required to warm or cool the engine means by modulation of coolant fluid flow through the thermostatic control means. The first inlet of the switching valve is in connection with a first conduit which includes the first heat exchanger, and receives coolant flow from the recouperator therethrough. The second inlet of the switching valve is in connection with a second conduit which includes the second heat exchanger, and receives coolant fluid flow therethrough. The switching valve thus selectively switches to receive the coolant flow through either the first heat exchanger in the cooling mode of operation or through the second heat exchanger in the heating mode of operation.

The second conduit also includes a second pump and an auxiliary heating means to flow auxiliary heated coolant fluid to the second heat exchanger in the heating mode of operation.

Finally, in the second embodiment a third conduit means connects to a point on the second conduit means downstream of the second pump means, auxiliary heating means, and second heat exchanger. The third conduit thereby returns heated coolant fluid to the recouperator and subsystem through a check valve during the heating mode of operation by selective operation of the second pump means and the auxiliary heating means. The inclusion of the redesigned recouperator in the auxiliary heating loop improves the ability of the auxiliary heating means to preheat the engine.

The foregoing and other advantages of the invention will become apparent from the following disclosure in which the preferred embodiment of the invention is described in detail and illustrated in the accompanying drawings. It is contemplated that variations in the procedure, structural features and arrangement of parts may appear to those skilled in the art without departing from the scope or sacrificing any of the advantages of the invention.

DETAILED DESCRIPTION OF THE PREFERRED EMBODIMENTS

Figure 1:
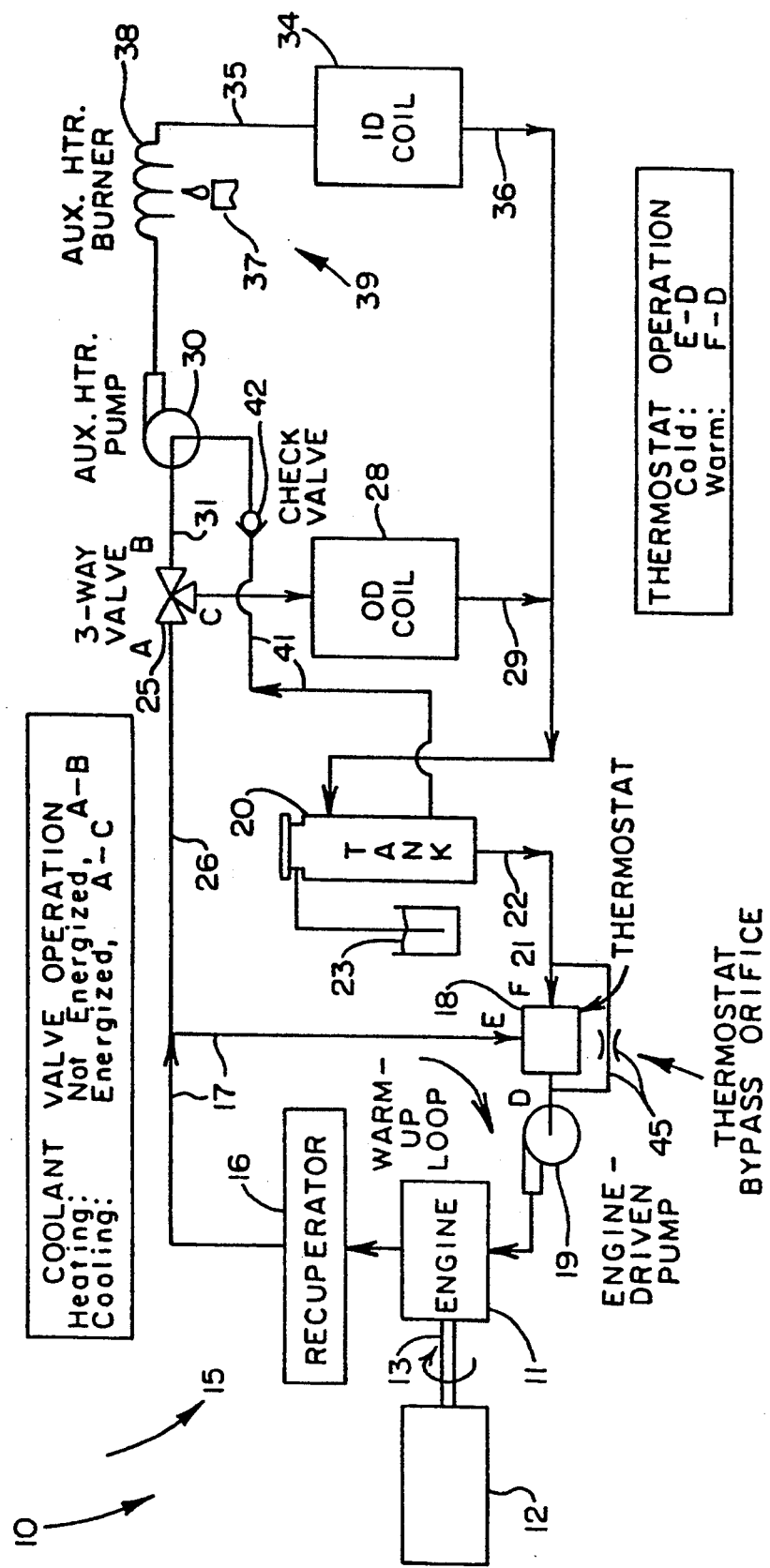
FIG. 1 is a schematic drawing of the first embodiment of the system and subsystem of the invention.

Referring to FIG. 1, a heat pump system, referred to generally as 10 includes a heat engine 11 mechanically connected to a refrigerant cycle compressor 12 by a mechanical rotational means 13. The engine 11 is preferably a natural gas fueled internal combustion engine This has been successfully used in a developmental example system, but there could be other types of heat engines to which the invention would be applicable and useful.

The compressor means 12 of the heat pump system 10 is preferably of the vapor compression refrigeration cycle type that is employed in a conventional heat pump system constructed to provide cooling and dehumidifying at an indoor heat exchanger coil in a cooling mode of operation; or to provide heat to a load in a heating mode of operation, with heat pumping from an outdoor heat exchanger which operates to exchange heat with outside ambient air as a source of heat or a heat sink.

This invention relates to a subsystem indicated generally as 15 to provide additional heating or cooling to the total heat pump system by capturing heat from the engine 11 that is generated in the combustion process but not used to drive the compressor 12. This so called waste heat is captured from the engine itself and from a recouperator 16 which is connected to the engine. The recouperator 16 receives a coolant fluid flowing through a network of connections and conduits to be further described. The recouperator 16 may be a muffler of the engine 11 or other mechanical component of the engine capable of radiating and exchanging heat to the coolant fluid.

A connection 17 is provided between the recouperator 16 and a thermostatic coolant fluid control means 18 which is connected to receive and control the coolant fluid flow in response to the temperature of the coolant fluid flowing therein.

The thermostatic control means 18 maybe of the bimetallic spring-loaded type, or of other construction which responds to open, modulate, and control a flow of coolant fluid as it is conveyed to a first pump means 19 and thence return to the engine 11 by a connection thereto.

The recouperator 16, connection 17, thermostatic control means 18, and first pump means 19 constitute a coolant fluid "loop" circuit hereafter termed the warm-up loop, which is operable by the control of the thermostatic means 18 to warm or cool the engine 11 temperature more rapidly when the subsystem operations will benefit therefrom.

A coolant fluid reservoir means 20, which is shown in the form of a tank, is connected to an inlet 21 of the thermostatic control means 18 by a connection 22. The reservoir means 20 is maintained replenished as necessary from an ambient overflow tank 23. The thermostatic control means 18 is operable to warm or control the engine temperature by modulating flow between coolant fluid from the warm-up loop or from the reservoir 20 as required to provide coolant fluid to the engine and to maintain the engine operating temperature at or near optimum thermal efficiency through the various facets of engine operation, from start-up to full-load in steady state or intermittent operating situations.

Although not shown, the engine is provided with the usual combustion and ignition controls which operate by sensing and responding to load conditions in the conditioned space environment with which the heat pump system 10 is associated.

Further in the subsystem 15, a coolant fluid switching valve means 25 is connected to the recouperator 16 by a conduit connection 26. A first heat exchanger 28 is connected to an outlet of a switching valve means 25. The first heat exchanger 28 is in heat exchange relation to a heat source or sink, such as outdoor ambient air.

Heat exchanger 28 is connected by connections 29 to the reservoir means 20.

In the cooling mode of operation fluid heat is exchanged with outdoor air in the first heat exchanger 28 before being conveyed to the reservoir means 20. From the reservoir 20, flow to the engine 11 is modulated and controlled by the thermostatic control means 18.

In most circumstances, during the cooling mode of operation except during warm-up, coolant fluid will circulate under the influence of first pump means 19 through the outdoor first heat exchanger 28 and the warm-up loop will be modulated by the thermostatic control means 18.

A second pump means 30 and an auxiliary heating means 39 are connected to the coolant fluid switching valve means 25 by a connection 31. In the normal heating mode, coolant is flowed through the second pump means 30 by the first pump means 19, and then flowed through the auxiliary heating means 39 to the second heat exchanger 34 through connection 35. The second heat exchanger 34 is in heat exchange relation to a heating or cooling load such as the indoor air in the conditioned space to which the heat pump system 10 is connected. Heat exchanger 34 is then connected by means of a connection 36 to the reservoir means 20. Conventionally, the second heat exchanger 34 may be a finned coil in the air duct of a forced air heating and cooling system, and the auxiliary heat means 39 may be a gas burner 37 in association with a heat exchange coil 38.

It is understood that, alternatively, the auxiliary heating means 39 may be positioned downstream (not shown) from the second heat exchanger 34. However, it has been found that the preferred position upstream of the second heat exchanger 34, as shown in FIG. 1, provides superior performance.

In the heating mode of operation by selective and controlled operation of the second pump means 30 and the auxiliary heating means 38, additional heat is supplied to the coolant fluid, in which the coolant fluid is drawn from the reservoir means 20 through connection 41 and check valve 42 to increase the supply of heat at the second heat exchanger 34 and to the load.

As a control measure an orificed bypass connection 45 may be provided to assure that a small quantity of coolant fluid is always available to the engine under all operating conditions so that the coolant may be appropriately circulated during preheat and engine warm-up.

Operationally, the subsystem 15 of this invention provides improvements in many of the total system operating parameters. A gas engine heat pump operating to condition the internal environment of a building, is required to start and stop frequently in response to changes in outdoor ambient conditions and indoor space changing conditions. It is well known that heat engines are relatively less efficient in start-up conditions because engine temperatures are not at their peak operational conditions and the engine coolant may have returned to ambient conditions.

A feature of this invention is that the warm-up loop operates to bring the coolant to optimum operating temperature very quickly. When the engine warms to operating temperature, further heat energy of the coolant is immediately available to the indoor heat exchanger, or maybe dissipated to the outdoor ambient air conditions through the outdoor heat exchanger.

In addition, when the engine is cold in early warm-up operation, the coolant valve means 25 can be switched to flow coolant to the second heat exchanger to supply warm coolant fluid to the second heat exchanger when the heat pump is operating in the cooling mode to improve the dehumidification capabilities of the system.

It has been noted in the operation of the subsystem 15 in an operational example system, that there are the following advantages over similar systems including:

The auxiliary heat function provided by the second pump means 30 and auxiliary heating means 39 is not affected by the proper operation of either the coolant switching valve means 25 or the thermostatic control means 18. In earlier versions of coolant fluid subsystems, it had been noted that during combined operation of the first pump means 19 and the second pump means 30, the second pump means 30 can cause overdriving of the first pump means 19, which can cause decoupling of the first pump means 19. In the embodiment shown in FIG. 1, the decoupling phenomenon is eliminated when the second pump means 30 draws coolant fluid directly from the tank 20 through connection 41, thus bypassing the first pump means 19.

Higher temperature thermostatic control valves may be used permitting an improvement in the engine brake thermal efficiency. At the same time, the peak coolant temperatures in the system are reduced and the coolant life is extended. The thermal cyclic losses are decreased, and the COP of the total system is thus improved.

The engine warm-up loop may be reduced in size and the coolant volume therein reduced to reduce the cost of piping and hardware while still decreasing engine warm-up time.

Cyclic and steady state operating efficiencies are improved in the subsystem, and capability of purging air from the second heat exchanger is improved.

Figure 2:
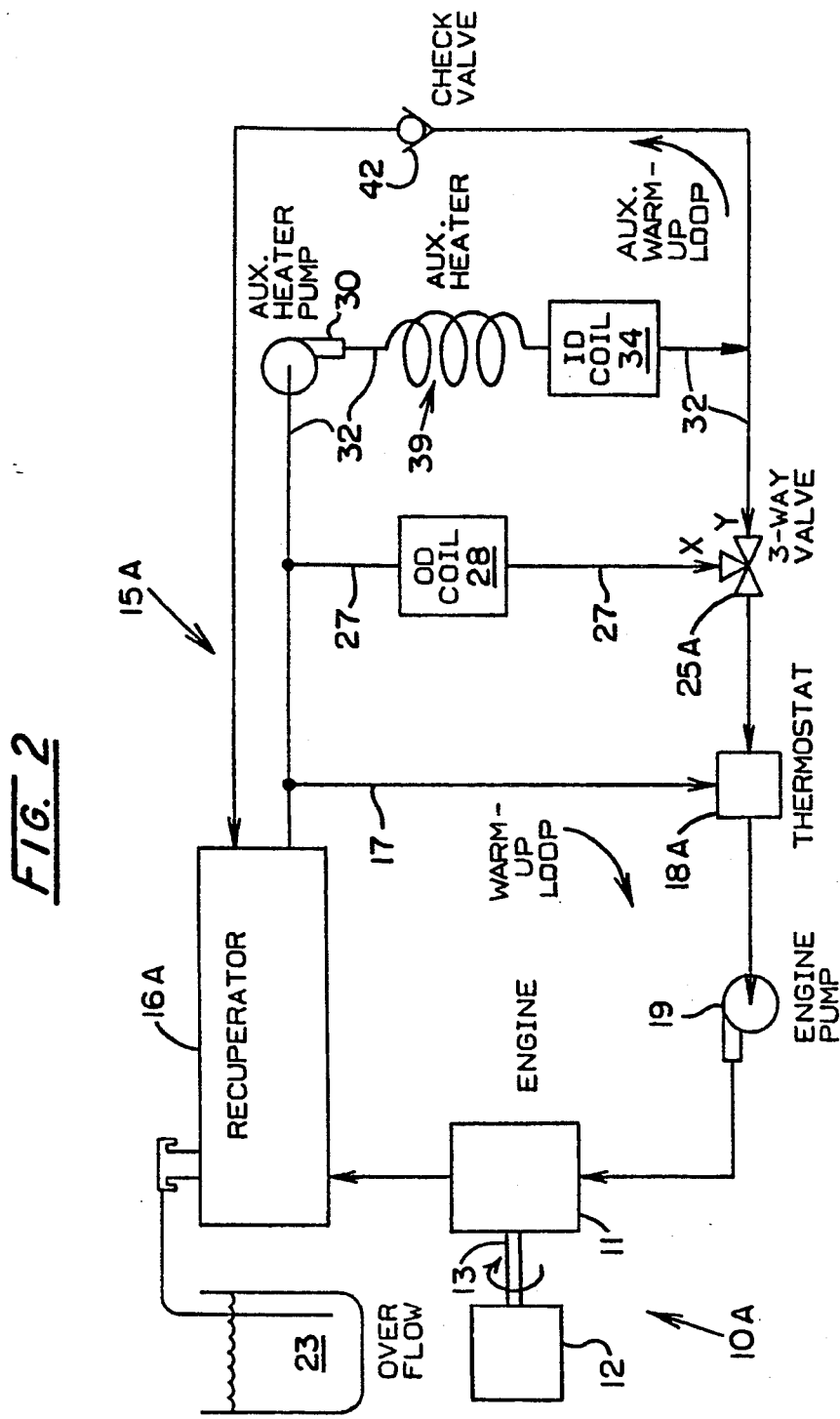
FIG. 2 is a schematic drawing of second, preferred embodiment of the system and subsystem of the invention.

Referring now to FIG. 2, where like numbers represent like elements, the heat pump system is referred to generally as 10A. System 10A again includes a heat engine 11, a refrigerant cycle compressor 12, and mechanical rotational means 13, as previously described in accordance with the first embodiment of FIG. 1.

The second embodiment of the present invention also relates to a subsystem, indicated generally as 15A, which provides additional heating or cooling to the total heat pump system by capturing heat from the engine 11 that is generated in the combustion process but not used to drive the compressor 12. As in the first embodiment, the waste heat is captured from the engine 11 in a recouperator 16A which is connected to the engine 11. Recouperator 16A may include a muffler for the engine 11 or incorporate another mechanical component of the engine capable of radiating and exchanging heat to the coolant fluid. However, in the second embodiment, the recouperator 16A is redesigned with an increased fluid volume to replace the coolant fluid reservoir 20 of the first embodiment (see FIG. 1). Thus, in the second embodiment, the recouperator 16A both receives and supplies coolant fluid flowing through a network of connections and conduits to be further described. The recouperator means 16A is maintained replenished as necessary from an ambient overflow tank 23 connected at its fill port.

As shown in FIG. 2, a connection 17 is provided between the recouperator 16A and a thermostatic coolant fluid control means 18A which is connected to receive and control the coolant fluid flow in response to the temperature of the coolant fluid flowing therein.

The thermostatic control means 18A may be of the same types as previously described. As may be understood from FIG. 2, given the reconfiguration of system elements, while the thermostatic control means 18A may be a standard thermostatic valve, the need for an orificed bypass connection (present in the first embodiment of FIG. 1) may be eliminated.

The recouperator 16A, connection 17, thermostatic control means 18A, and first pump means 19 constitute a coolant fluid "loop" which functions, as before, as a warm-up loop, operable by the thermostatic means 18A to warm or cool the engine 11 temperature more rapidly when the subsystem operations will benefit therefrom.

The thermostatic control means 18A is operable to warm or control the engine temperature by modulating flow between coolant fluid from the warm-up loop or from the switching valve 25A, as required to provide coolant fluid to the engine and to maintain the engine operating temperature at or near optimum thermal efficiency through the various facets of engine operation, from start-up to full-load in steady state or intermittent operating situations.

The switching valve 25A provides coolant fluid from either a first conduit means 27 which includes a first heat exchanger 28 (the outdoor heat exchanger or outdoor coil), or a second conduit means 32 which includes a second heat exchanger 34 (the indoor heat exchanger or indoor coil).

The first heat exchanger 28 is in heat exchange relation to a heat source or sink, such as outdoor ambient air, and is connected by first conduit means 27 to receive and convey coolant flow from the recouperator 16A to the first inlet X of the switching valve 25A.

The second heat exchanger 34 is in heat exchange relation to a heating or cooling load such as the indoor air in the conditioned space to which the heat pump system 10 is connected, and is connected by second conduit means 32 to receive and convey coolant flow from the recouperator 16A to the second inlet Y of the switching valve 25A. Conventionally, the second heat exchanger 34 may be a finned coil in the air duct of a forced air heating and cooling system.

Although not shown, the engine is provided with the usual combustion and ignition controls which operate by sensing and responding to load conditions in the conditioned space environment with which the heat pump system 10A is associated.

In the cooling mode of operation fluid heat is exchanged with outdoor air in the first heat exchanger 28 before being circulated back through the switching valve 25A and thermostatic control means 18A back to the engine 11.

As in the first embodiment, in most circumstances, during the cooling mode of operation, except during warm-up, coolant fluid will circulate under the influence of first pump means 19 through the outdoor first heat exchanger 28 and the warm-up loop will be closed by the thermostatic control means 18A.

In addition, as in the first embodiment, the second embodiment includes a second pump means 30 and an auxiliary heating means 39 positioned in series with the indoor second heat exchanger 34. In the normal heating mode, coolant is flowed through the second pump means 30 by the first pump means 19 to the auxiliary heating means 39, such as described above with gas burner 37 and coil 38 (although other means may be suitable), and thence to the second heat exchanger 34. The second heat exchanger 34 connects to the second inlet Y of switching valve 25A through the second conduit means 32.

Again, it is understood that, alternatively, the auxiliary heating means 39 may be positioned downstream (not shown) from the second heat exchanger 34, but that the position upstream of the second heat exchanger 34, as shown in FIG. 2, is preferred for superior performance.

In the heating mode of operation by selective and controlled operation of the second pump means 30 and the auxiliary heating means 39, additional heat is supplied to coolant fluid drawn from recouperator 16A and circulated through check valve 42 to increase the supply of heat at the second heat exchanger 34 and to the load.

Operationally, the subsystem 15A of the second embodiment provides further improvements in many of the total system operating parameters identified with regard to the first embodiment. Again, because heat pumps frequently start and stop in operation, and are relatively less efficient in start-up conditions, rapid warm-up to operating temperatures is desirable.

A feature of the second embodiment of the invention is that the redesigned recouperator 16A reduces the amount of coolant charge required for the subsystem 15A, further reducing the warm-up time required to bring the coolant to optimum operating temperature, and reducing steady state heat losses from the coolant circuit. When the engine warms to operating temperature, more heat energy of the coolant is immediately available to the indoor heat exchanger 34, or maybe dissipated to the outdoor ambient air conditions through the outdoor heat exchanger 28.

In addition, the coolant valve means 25A can be switched to flow coolant to the second heat exchanger 34 to supply warm coolant fluid to the second heat exchanger 34 when the heat pump is operating in the cooling mode to improve the dehumidification capabilities of the system. Dehumidification control occurs predominately after the engine is warmed up.

The operational advantages of the present invention over similar systems which were identified with respect to the first embodiment are equally provided by the second embodiment. These include: the ability to provide the auxiliary heat function unaffected by the proper operation of either the coolant switching valve means 25A or the thermostatic control means 18A; the subsystem configuration does not cause the second pump means 30 to cause overdriving and decoupling of the first pump means 19; the ability to use higher temperature thermostatic control valves which permit improved engine brake thermal efficiency; reduction in the peak coolant temperatures in the system, and extended coolant life; improved system COP by reducing the thermal cyclic losses; and a smaller engine warm-up loop and coolant volume therein, which reduces the cost of piping and hardware.

The second embodiment has the further advantages of: elimination of the expensive reservoir component; improved cyclic and steady state operating efficiencies; use of the recouperator as the fill point for the coolant subsystem which eliminates the need to bleed air from the high point of the subsystem (the recouperator) when initially filling the subsystem; greater cross-sectional area of the recouperator which improves the ability of the system to separate and remove air bubbles from the coolant during both filling and operation; easier initial filling of the subsystem with coolant; and use of a standard thermostat with no bypass necessary.

It is herein understood that although the present invention has been specifically disclosed with the preferred embodiments and examples, modifications and variations of the concepts herein disclosed may be resorted to by those skilled in the art. Such modification and variations are considered to be within the scope of the invention and the appended claims.

What is claimed is:

1. A heat engine driven heat pump system comprising:
   a) a refrigeration cycle heat pump compressor driven by a heat engine means;
   b) a coolant fluid circulation subsystem including a recouperator means in fluid connection with the heat engine to receive a coolant fluid flowed from the engine, and wherein said recouperator means further includes a volume comprising a coolant fluid reservoir for supply of coolant fluid to said subsystem;
   c) a thermostatic coolant fluid control means in fluid connection with the recouperator means to receive through a first inlet and control the coolant fluid flow in response to the temperature of the coolant fluid;
   d) a first pump means in fluid connection with the thermostatic fluid control means to convey coolant fluid to the engine and complete a first loop circuit, operable by the control of the thermostatic means to warm or cool the engine more rapidly when the subsystem operation will benefit therefrom;
   e) a switching valve means in fluid connection with a second inlet of the thermostatic control means to supply coolant fluid to the engine means as required to warm or cool the engine means by modulation of coolant fluid flow through the thermostatic control means, and, further, to receive coolant fluid flow, in fluid connection with
      A) a first conduit means, including a first heat exchanger in heat exchange relation to an ambient heat source or sink, conveying coolant flow from the recouperator to the switching valve, or with
      B) a second conduit means, including a second heat exchanger in heat exchange relation to a heating or cooling load, said second conduit means receiving and conveying coolant fluid flow from the recouperator to the switching valve,
   to selectively switch the coolant fluid flow to receive such flow through the first heat exchanger in the cooling mode of operation or through the second heat exchanger in the heating mode of operation;
   f) a second pump means and an auxiliary heating means in the second conduit between the recouperator and the switching valve means to flow auxiliary heated coolant fluid to the second heat exchanger in the heating mode of operation; and
   g) a third conduit means connecting the second conduit means at a position downstream of the second pump means, auxiliary heating means, and second heat exchanger, directly to the recouperator through a check valve means, to return coolant fluid from the second heat exchanger during the heating mode of operation by selective operation of the second pump means and the auxiliary heating means.

2. A system according to claim 1 wherein the second pump means is located between the recouperator means and the auxiliary heating means to supply coolant fluid to the second heat exchanger located between the auxiliary heating means and the switching valve.

3. A system according to claim 1 wherein the second pump means is located between the recouperator means and the second heat exchanger to supply coolant fluid through the second heat exchanger means to the auxiliary heating means located between the second heat exchanger and the switching valve.

4. A system according to claim 1 wherein the first pump means is driven by the engine.

5. A system according to claim 1 wherein the switching valve means is switched to receive coolant fluid flow from the second conduit and open the second conduit to supply warm coolant fluid flow from the recouperator to the second heat exchanger when the heat pump is operating in the cooling mode to improve the dehumidification capabilities of the system.

6. A system according to claim 1 wherein the heat engine means is a natural gas fueled internal combustion engine.

7. A system according to claim 1 wherein the recouperator means includes a muffler, reservoir volume to receive and supply coolant fluid to the subsystem.

8. A system according to claim 1 wherein the recouperator includes a high point in the subsystem to receive air trapped in the coolant subsystem, and automatically eliminates air therefrom.

9. A system according to claim 1 wherein the thermostatic coolant fluid control means is a three-way valve having two inlets and an outlet with a temperature sensing element controlling flow through the valve between the inlets according to the temperature of the coolant flow in the valve.

10. A system according to claim 1 wherein the switching valve means is a three-way valve having two inlets and an outlet with an operator means to avert coolant flow between the inlets.

11. A system according to claim 1 wherein the auxiliary heating means is a gas burner and heat receiver means through which the coolant is flowed.

12. A gas fueled internal combustion engine driven heat pump system comprising:
   a) a refrigeration cycle heat pump compressor driven by a gas fueled internal combustion engine;
   b) a coolant fluid circulation subsystem including a recouperator means in fluid connection with the engine to receive a coolant fluid flowed from the engine, and wherein said recouperator means further includes a volume comprising a coolant fluid reservoir for supply of coolant fluid to said subsystem;
   c) a thermostatic coolant fluid control means in fluid connection with the recouperator means to receive through a first inlet and control the coolant fluid flow in response to the temperature of the coolant fluid;
   d) a first pump means in fluid connection with the outlet of the thermostatic fluid control means to convey coolant fluid to the engine and complete a first loop circuit, operable by the control of the thermostatic means to warm or cool the engine more rapidly when the subsystem operation will benefit therefrom;
   e) a switching valve means in fluid connection with a second inlet of the thermostatic control means to supply coolant fluid to the engine means as required to warm or cool the engine means by modulation of coolant fluid flow through the thermostatic control means, and, further, to receive coolant fluid flow, in fluid connection with
- A) a first conduit means, including a first heat exchanger in heat exchange relation to an ambient heat source or sink, conveying coolant flow from the recuperator to the switching valve, or with a
- B) a second conduit means, including a second heat exchanger in heat exchange relation to a heating or cooling load, said second conduit means receiving and conveying coolant fluid flow from the recuperator to the switching valve, to selectively switch the coolant fluid flow to receive such flow through the first heat exchanger in the cooling mode of operation or through the second heat exchanger in the heating mode of operation;
- f) a second pump means and an auxiliary heating means in the second conduit between the recuperator and the switching valve means to flow auxiliary heated coolant fluid to the second heat exchanger in the heating mode of operation; and
- g) a third conduit means connecting the second conduit means at a position downstream of the second pump means, auxiliary heating means, and second heat exchanger, directly to the recuperator through a check valve means, to return coolant fluid from the second heat exchanger during the heating mode of operation by selective operation of the second pump means and the auxiliary heating means.

13. A system according to claim 12 wherein the second pump means is located between the recuperator means and the auxiliary heating means to supply coolant fluid through the auxiliary heating means to the second heat exchanger located between the auxiliary heating means and the switching valve.

14. A system according to claim 12 wherein the second pump means is located between the recuperator means and the second heat exchanger to supply coolant fluid through the second heat exchanger means to the auxiliary heating means located between the second heat exchanger and the switching valve.

15. A heat engine driven heat pump system comprising:
- a) a refrigeration cycle heat pump compressor driven by a heat engine means;
- b) a coolant fluid circulation subsystem including a recuperator means in fluid connection with the heat engine to receive a coolant fluid flowed from the engine, and wherein said recuperator means further includes a volume comprising a coolant fluid reservoir for supply of coolant fluid to said subsystem;
- c) a thermostatic coolant fluid control means in fluid connection with the recuperator means to receive through a first inlet and control the coolant fluid flow in response to the temperature of the coolant fluid;
- d) a first pump means in fluid connection with the thermostatic fluid control means to convey coolant fluid to the engine and complete a first loop circuit, operable by the control of the thermostatic means to warm or cool the engine more rapidly when the subsystem operation will benefit therefrom;
- e) a switching valve means controlling coolant fluid flow to a second inlet of the thermostatic control means to supply coolant fluid to the engine means as required to warm or cool the engine means by modulation of coolant fluid flow through the thermostatic control means, and the switching valve means controlling fluid flow from said recuperator through
  - A) a first heat exchanger in heat exchange relation to an ambient heat source or sink, or through
  - B) a second heat exchanger in heat exchange relation to a heating or cooling load, selectively switching such coolant fluid flow through the first heat exchanger in the cooling mode of operation or through the second heat exchanger in the heating mode of operation;
- f) a second pump means and an auxiliary heating means in series with and upstream of the second heat exchanger to flow auxiliary heated coolant fluid to the second heat exchanger in the heating mode of operation; and
- g) a conduit means positioned downstream of the second pump means, auxiliary heating means, and second heat exchanger, to receive and return coolant fluid flow through a check valve means directly to the recuperator, and to return coolant from the second heat exchanger during the heating mode of operation by selective operation of the second pump means.

16. A system according to claim 15 wherein the heat engine means is a natural gas fueled internal combustion engine.

17. A system according to claim 1 wherein the recuperator includes the highest point in the subsystem to receive air trapped in the coolant subsystem, and automatically eliminates air therefrom.

18. A system according to claim 12 wherein the recuperator includes the highest point in the subsystem to receive air trapped in the coolant subsystem, and automatically eliminates air therefrom.

19. A system according to claim 15 wherein the recuperator includes the highest point in the subsystem to receive air trapped in the coolant subsystem, and automatically eliminates air therefrom.

* * * * *